April 19, 1949. W. M. TINGDALE 2,467,411
WIRE BASKET HAVING EXTENDED WIRE REENFORCEMENTS
BENT TO FORM SLIDING CARD HOLDERS
Filed March 19, 1945
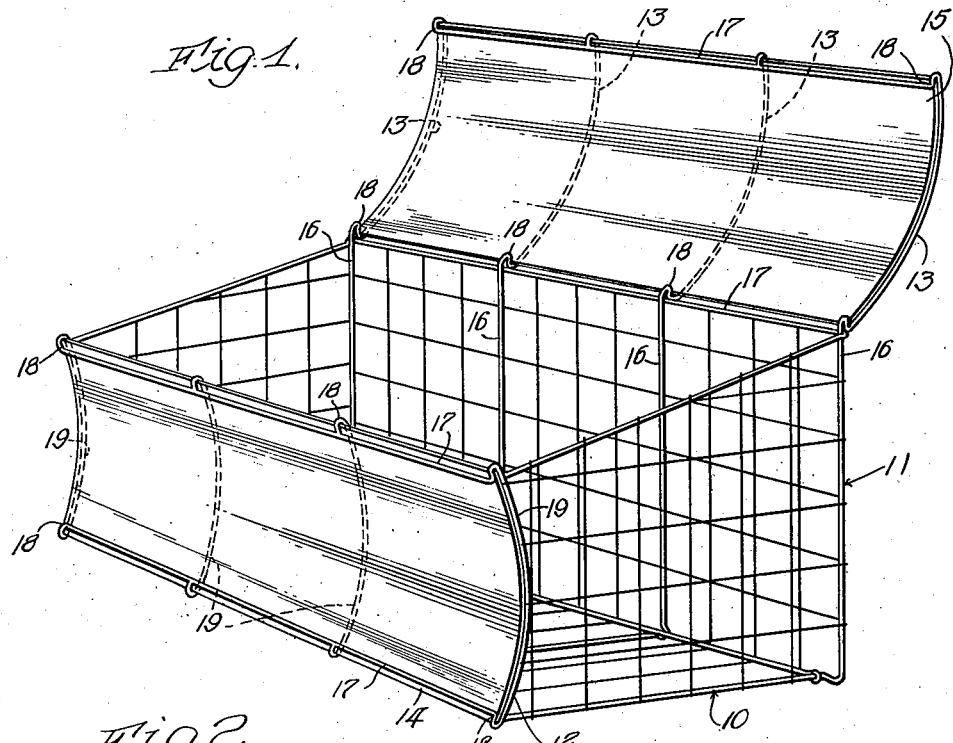
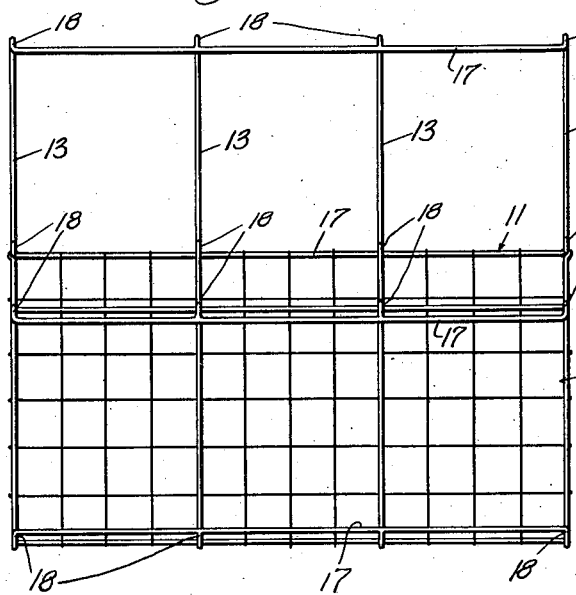
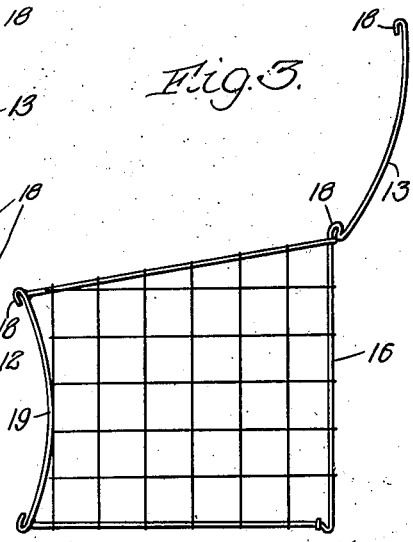
Inventor,
Warren M. Tingdale, Patented Apr. 19, 1949

2,467,411

UNITED STATES PATENT OFFICE 2,467,411

WIRE BASKET HAVING EXTENDED WIRE REINFORCEMENTS BENT TO FORM SLIDING CARD HOLDERS

Warren M. Tingdale, New York, N. Y., assignor to National Transitads, Inc.

Application March 19, 1945, Serial No. 583,529

4 Claims. (Cl. 40—7)

1

This invention relates to an advertising display device and particularly one in which articles of merchandise are contained for display purposes and wherein there are attached holders for retaining advertising cards.

One of the principal means of advertising products is to place advertising cards in buses, streetcars and other public transportation vehicles. This service is to bring the advertised articles to the attention of the public. It has been found that this method of advertising is quite successful and serves to create a demand for the advertised merchandise. I have discovered that this method of advertising may be carried one important step further by using similar advertising cards in retail sales outlets, such as grocery stores and the like. In order to do this there is provided a container or basket suitably made of wire mesh, and attached thereto is one or more holders for the same kind of advertising card as is used in the public transportation vehicles. These holders are preferably laterally concave in order to give substantially the same appearance as the card that is used in the vehicles. Thus, the member of the buying public observes the advertising card carrying the name of the advertised product in the bus or streetcar and a demand is created; then, when he is in a retail outlet such as a store, he sees this same card used in conjunction with the advertised product itself. In that way the demand is maintained right up to the source of supply.

A typical embodiment of this invention will be described as set out in the accompanying drawings. Of the drawings, Figure 1 is a perspective view of a wire mesh basket display device; Figure 2 is a front elevation of said basket with the front advertising card removed; and, Figure 3 is a side elevation of said basket.

The display device shown comprises a wire mesh basket 10 having rear wall 11 appreciably higher than the front wall 12. Above the back top edge of the basket 10, there is positioned a holder 15 for advertising matter; specifically for an advertising card as used in streetcars and buses. This back holder is inclined back from the vertical and is laterally concave so that the advertising card placed therein will have substantially the same curvature as those used in buses and streetcars.

At the front of the basket is a second holder 14 for advertising matter and is shaped substantially the same as the first holder 15. This second holder is also laterally concave and has top and bottom edge portions lying substantially in a vertical plane. In the embodiment shown, the front wall 12 of the basket forms a part of the second holder 14.

The baskets are preferably made approximately 26 inches long and 13 inches wide. The card holders will then accommodate the ordinary 11 x 28 advertising cards as used in streetcars and buses. The smaller size of card is 11 x 14 and these cards may also be used in the holders by providing holding means located intermediate of the ends of the basket. As shown in Figure 1, the back holder 15 is made of relatively heavy wire 13, which are merely extensions of lateral reinforcements 16 employed in making the basket 10. There may be four of these lateral reinforcements, one at each end of the basket and two intermediate of these and spaced so that they divide the basket into substantially equal portions. With such a construction, all four of the heavy wire extensions 13 will be used to hold the 11 x 28 card, while the two in the center will be used to hold the 11 x 14 card. At the top and bottom of the back holder, there are preferably provided other sections of heavy wire 17 extending lengthwise of the holder and fastened, as by welding, to the ends of hooked portions 18 that are provided to hold the margins of the advertising card. The hooked portions 18 and the two length-wise wires 17 serve to hold the advertising card securely in place. In order that a card 11 inches wide will be firmly clamped by the spring action of the heavy wire extensions 13, it is preferred that the wire extensions 13 be about 10⅝ inches between the hooks.

The second holder 14, which is located at the front of the basket, is made substantially similar to the back holder 15. Here the heavy wire portions 19 have substantially the same curve and the same dimensions as wires 13. In the construction shown, the heavy wire portions 19 also serve as reinforcements for the front of the basket.

The display device that is shown has advertising card holders only in the back and at the front of the basket.

Having described my invention in considerable detail with respect to one embodiment of the same, it is my intention that the invention be not limited by these details unless otherwise specified, but rather be construed broadly within the spirit and scope of the invention, as set out in the accompanying claims.

I claim:

1. A container comprising wire mesh front, back, bottom, and end walls having spaced reinforcements of heavy wire extending laterally of the back and bottom walls of the container, said reinforcements being extended above the top rear edge of the container and lying in a concave, upright plane to provide a backing for an advertising card and being bent at points adjacent the horizontal edges of the card to provide holding means for the card.

2. The container of claim 1 wherein the top ends of said reinforcements are connected by a substantially horizontal wire.

3. A container comprising wire mesh front, back, bottom, and end walls having spaced reinforcements of heavy wire extending laterally of the back and bottom walls of the container, said front wall of the container being outwardly concave to provide a backing for an advertising card and having lateral reinforcements on said front wall bent over at the ends thereof to provide hooked portions adjacent the horizontal edges of the card to provide holding means for the cards.

4. A container comprising wire mesh front, back, bottom, and end walls having spaced reinforcements of heavy wire extending laterally of the back and bottom walls of the container, said front wall of the container being outwardly concave to provide a backing for an advertising card and having lateral reinforcements on said front wall bent over at the ends thereof to provide hooked portions adjacent the horizontal edges of the card to provide holding means for the cards, said back and bottom reinforcements being extended above the top rear edge of the container and lying in a concave, upright plane to provide a backing for a second advertising card and being bent at points adjacent the horizontal edges of said second card to provide holding means for the card.

WARREN M. TINGDALE.

REFERENCES CITED

The following references are of record in the file of this patent:

UNITED STATES PATENTS

| Number | Name | Date |
|---|---|---|
| 266,815 | Harris | Oct. 31, 1882 |
| 664,517 | Webb | Dec. 25, 1900 |
| 747,997 | Mitchell | Dec. 29, 1903 |
| 1,128,052 | Roy | Feb. 9, 1915 |
| 1,231,849 | Clinton | July 3, 1917 |
| 1,284,579 | Brown | Nov. 12, 1918 |
| 1,347,942 | Forward | July 27, 1920 |
| 1,452,257 | Singer et al. | Apr. 17, 1923 |
| 1,611,231 | Ratterman | Dec. 21, 1926 |
| 1,683,554 | Kenyon | Sept. 4, 1928 |
| 1,788,724 | Libera | Jan. 13, 1931 |
| 1,932,890 | Grondahl | Oct. 31, 1933 |
| 1,933,974 | Grimshaw | Nov. 7, 1933 |
| 1,969,245 | Verhglen | Aug. 7, 1934 |
| 2,049,140 | Schick | July 28, 1936 |
| 2,114,424 | Jesse et al. | Apr. 19, 1938 |
| 2,351,260 | Hall | June 13, 1944 |